US 9,411,664 B1

(12) United States Patent
Bradbury et al.

(10) Patent No.: US 9,411,664 B1
(45) Date of Patent: Aug. 9, 2016

(54) FINGERPRINT-BASED PROCESSOR PARAMETER MANAGEMENT

(71) Applicant: International Business Machines Corporation, Armonk, NY (US)

(72) Inventors: Jonathan D. Bradbury, Poughkeepsie, NY (US); Giles R. Frazier, Austin, TX (US); Michael Karl Gschwind, Chappaqua, NY (US); Christian Jacobi, Poughkeepsie, NY (US); Anthony Saporito, Highland, NY (US); Chung-Lung K. Shum, Wappingers Falls, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/958,142

(22) Filed: Dec. 3, 2015

(51) Int. Cl.
G06F 13/00 (2006.01)
G06F 9/54 (2006.01)
G06F 9/445 (2006.01)

(52) U.S. Cl.
CPC ............ *G06F 9/542* (2013.01); *G06F 9/44505* (2013.01)

(58) Field of Classification Search
CPC ................................ G06F 8/443; G06F 9/542
USPC .................................. 717/151, 154; 719/318
See application file for complete search history.

(56) References Cited

U.S. PATENT DOCUMENTS

| 5,748,961 | A | 5/1998 | Hanna et al. |
| 6,978,450 | B2 | 12/2005 | Burch |
| 7,174,544 | B2 | 2/2007 | Zee |
| 8,369,564 | B2 | 2/2013 | Hervas et al. |
| 8,612,948 | B2 | 12/2013 | Kawachiya et al. |
| 8,756,582 | B2 * | 6/2014 | Serrano ............... G06F 11/3612 717/128 |
| 8,782,434 | B1 * | 7/2014 | Ghose ................... G06F 9/3851 711/118 |
| 8,972,975 | B1 | 3/2015 | Rogers |
| 2011/0138373 | A1 * | 6/2011 | Lane ....................... G06F 8/443 717/157 |

OTHER PUBLICATIONS

Brisk, Philip, et al.; "A Dictionary Construction Technique for Code Compression Systems with Echo Instructions"; LCTES '05; p. 105-114; Jun. 15-17, 2005.
Debray, Saumya K., et al.; "Compiler Techniques for Code Compaction"; ACM Transactions on Programming Languages and Systems; vol. 22, No. 2; p. 378-415; Mar. 2000.

(Continued)

*Primary Examiner* — Andy Ho
(74) *Attorney, Agent, or Firm* — Cantor Colburn LLP; William A. Kinnaman, Jr.

(57) ABSTRACT

Embodiments relate to fingerprint-based processor parameter management. An aspect includes determining a fingerprint of software that is currently executing on a processor of a computer system, the fingerprint comprising a representation of a sequence of behavior that occurs in the processor while the software is executing. Another aspect includes determining whether the fingerprint is listed in a fingerprint table with an associated operating parameter value. Another aspect includes based on determining that the fingerprint is listed in the fingerprint table, setting an operating parameter in a parameter register of the processor equal to the associated parameter operating parameter value. Another aspect includes based on determining that the fingerprint is not listed in the fingerprint table: determining a value for operating parameter during execution of the software; and setting the operating parameter in the parameter register equal to the determined value.

20 Claims, 4 Drawing Sheets

(56) References Cited

OTHER PUBLICATIONS

Giles R. Frazier, et al.,"Application-Level Initiation of Processor Parameter Adjustment", U.S. Appl. No. 14/958,148, filed Dec. 3, 2015.

Giles R. Frazier, et al.,"Application-Level Processor Parameter Management", U.S. Appl. No. 14/958,151, filed Dec. 3, 2015.

Giles R. Frazier, et al.,"Performance Optimization Engine for Processor Parameter Adjustment", U.S. Appl. No. 14/958,153, filed Dec. 3, 2015.

List of Patents or Patent Applications Treated as Related; Date Filed-:Dec. 3, 2015, p. 1-2.

* cited by examiner

FINGERPRINT-BASED PROCESSOR PARAMETER MANAGEMENT

BACKGROUND

The present invention relates generally to computer processors, and more specifically, to fingerprint-based processor parameter management.

One of the functions of a managed run-time environment is processor performance optimization. Optimization typically involves compiling code so as to provide optimal processor performance for the current workload and hardware. Such code optimization may significantly improve processor performance during execution of the code. Processor performance may be further increased by adjustment of the hardware configuration and/or operating parameters of a processor to fit a specific workload. However, a hypervisor or operating system (OS), which may have access to the operating parameters of the processor, may have no knowledge of the actual current runtime environment workload.

SUMMARY

Embodiments include a method, system, and computer program product for fingerprint-based processor parameter management. An aspect includes determining a fingerprint of software that is currently executing on a processor of a computer system, the fingerprint comprising a representation of a sequence of behavior that occurs in the processor while the software is executing. Another aspect includes determining whether the fingerprint is listed in a fingerprint table with an associated operating parameter value. Another aspect includes based on determining that the fingerprint is listed in the fingerprint table, setting an operating parameter in a parameter register of the processor equal to the associated parameter operating parameter value. Another aspect includes based on determining that the fingerprint is not listed in the fingerprint table: determining a value for operating parameter during execution of the software; setting the operating parameter in the parameter register equal to the determined value; and storing the fingerprint with the determined value in the fingerprint table. Another aspect includes executing the software by the processor according to the parameter register.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
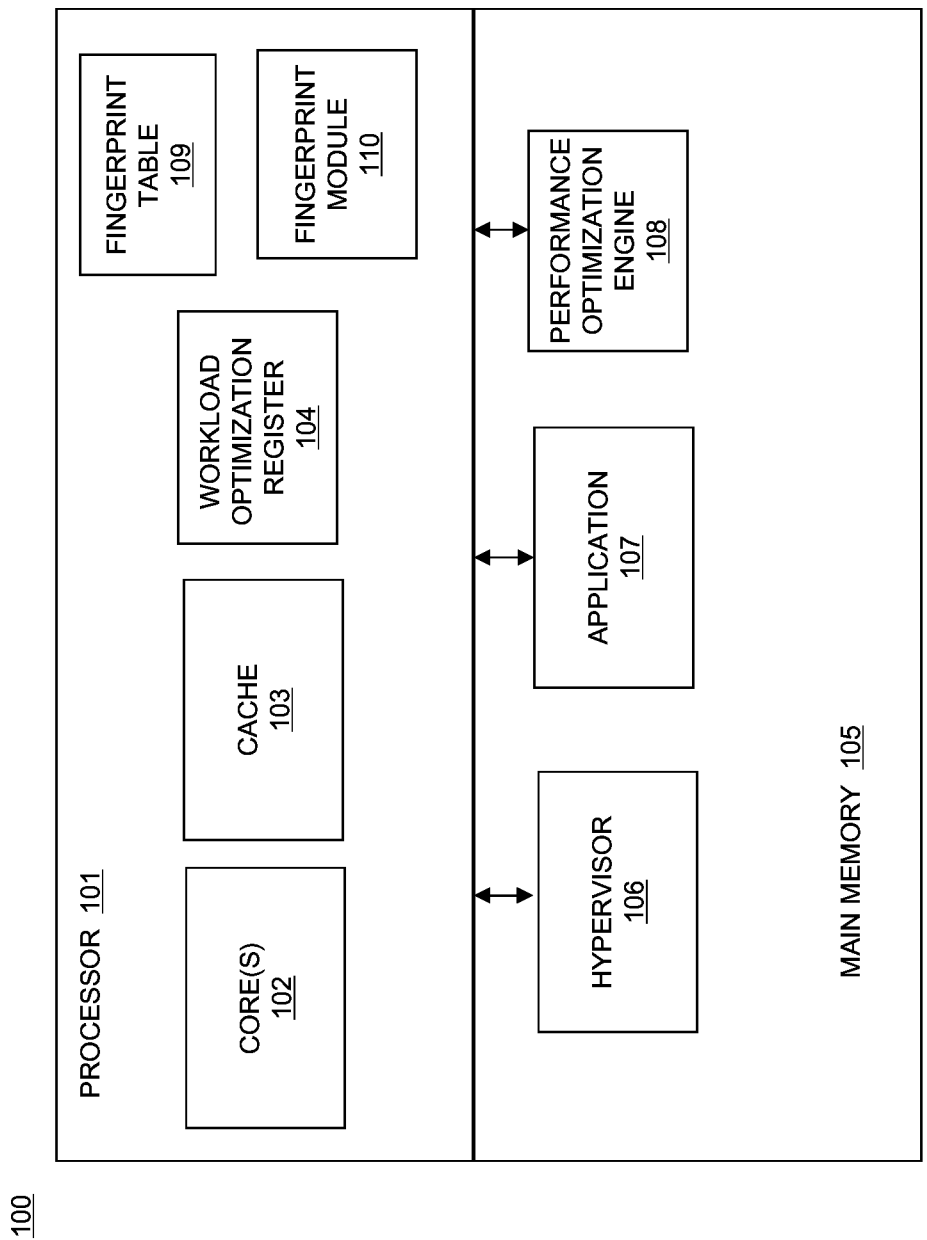
FIG. 1 depicts a computer system for implementing fingerprint-based processor parameter management in accordance with an embodiment.

Embodiments of fingerprint-based processor parameter management are provided, with exemplary embodiments being discussed below in detail. Depending on the task that is being performed by an application, the optimal set of processor parameters for that task may vary. For example, if a task involves accessing successive entries of large arrays, it may be beneficial to increase the data prefetch depth so that the data that will be available for access in the cache. Improved branch prediction may be obtained by using the branch prediction algorithm that is most accurate for the application that is being executed. Also, the depth of the branch history tables might need to be greater for some conditions under which the application executes than for other conditions. Other processor configuration controls involving instruction routing and handling may also have optimal settings corresponding to the currently executing application. In order to identify the particular set of processor configuration parameters that best fit a given task being executed under a given set of conditions or processing a certain type of data, an analysis of the application's behavior is required. Fingerprints that represent processor behavior when an application is executing may therefore be used to identify the appropriate processor configuration parameters for a current task.

A fingerprint is a representation of specific processor behavior that occurs when a given code section of software is executing. The processor behavior may be any recognizable behavior in various embodiments. Examples of time-domain fingerprints include particular sequences of branch prediction hits and misses, a particular sequence of data cache hits and misses, or any other behavior or pattern recognizable by hardware. Further examples of time-domain code fingerprints include: data cache hit miss sequences (at various cache levels); data cache hit miss sequences subsequent to or leading up to a given instruction; data cache hit miss sequence for a specific set of loads identified by an instruction prefix; branch history value when a given instruction is executed; call signature or call signature history at a given instruction; and sequence of values of a come from address register (CFAR) of the processor at a given instruction. A fingerprint may also be based on steady-state conditions that include the following characteristics: average L1 data cache hit rate, L2 data cache hit rate, L3 data cache hit rate, average branch mispredict rate, average instruction fetch discard rate, and/or average instruction completion rate.

Various embodiments include a fingerprint recognition function, or fingerprint module. There may be a respective fingerprint recognition function for each type of fingerprint being detected. For example, a fingerprint detector that detects a specific sequence of load instruction data cache hits and misses may be implemented using a shift register that is referred to as a fingerprint register. Such a fingerprint register holds the sequence of the most-recent data cache hits and misses. A fingerprint register may be of arbitrary length in various embodiments, for example, 32 or 64 bits. The sequence of 1's and 0's in such a fingerprint register represent the most-recent history of load instruction data cache hits and misses, where a 0 indicates a data cache miss and a 1 indicates a data cache hit. Multiple shift registers may be included in the processor to provide other types of fingerprints, such as sequences of branches taken/not taken, sequences of branch prediction hit/misses, or sequences of data cache hit/misses for multiple cache levels. Further embodiments may generate a fingerprint that is based on a rate of occurrence of an event, such as the rate of load data cache misses over the previous 1000 load instructions, or the rate of branch prediction misses over the previous 1000 branch instructions. Further embodiments of a fingerprint may be generated based on function of multiple different fingerprints, using, for example, a sum or a difference of various fingerprints. Further embodiments of a fingerprint may be equal to the current calling context of the program or equal to the current value of the CFAR for the previous instance of a branch instruction. Any combination of different fingerprint types may be used in various embodiments.

Embodiments include a fingerprint table that is used to associate fingerprints with processor parameters that are appropriate for a method at each point at which the method is called. If the fingerprint table does not contain an entry corresponding to the fingerprint of currently executing software, a parameter set is determined for the method in any appropriate manner (e.g., by using counters to count various events, and making processor parameters adjustments based on measured processor performance during execution of the current task). An entry into the table is then created associate the fingerprint with the determined processor configuration parameter set. Then, when software having the same fingerprint subsequently calls the method, the parameter set corresponding to the fingerprint in the entry is written into the processor parameter register, and the software is executed according to the parameter set. The same software (e.g., a method) may have different behavior, and therefore different fingerprints, based on the call location from which the method was called. In some embodiments, the fingerprint table may be implemented as a content addressable memory (CAM), where the fingerprint is used to select the parameter set. Such an embodiment would eliminate any software overhead that would otherwise be necessary to scan the fingerprint table for a match.

Further embodiments may include multiple fingerprint tables corresponding to different types of fingerprints, such as fingerprint tables based on a data cache misprediction fingerprints and/or tables based on branch history type fingerprints. In such embodiments, branch-related processor parameters are contained in a branch-related fingerprint table, and prefetch-related processor parameters contained in a prefetch-related fingerprint table. The fingerprint is determined separately for each fingerprint type in order to select the optimal configuration parameters.

In some embodiments, the code fingerprint is evaluated whenever a method is called or whenever a particular program segment is executed. The fingerprint is then used to select a set of processor configuration parameters that have been previously been found to be optimal for the method or program segment when it was previously executed and the fingerprint was initially generated. Fingerprint-based processor parameter adjustment may be performed at each entry to a method call that is encountered during application execution, and may also be applied to an entire program during its execution. That is, as the program executes, a fingerprint is acquired and subsequently used to select the optimal processor parameter set for the program. The fingerprint may be rechecked periodically in situations in which resource contention with other programs on other threads of the processor caused conditions to change.

Processor parameters may be stored in one or more registers in the processor. In some embodiments, such a register may be referred to as a workload optimization register (WOR). In some embodiments, the WOR is written into by the hypervisor to set processor parameters; in other embodiments, certain parameters in the WOR may also be written into by the application. In some embodiments, additional registers holding values for additional control parameters may also be included in the processor. Processor parameters that may be stored in a WOR include, but are not limited to, the branch history algorithm, branch history depth, the cache data prefetch depth, whether to enable store-hit-load prevention, whether to route all fixed-point operations to the fixed point unit (FXU), whether to route all loads to the load unit (not the load store unit), the instruction prefetch depth, and the store gather window. Any WOR parameters may be adjusted based on a code fingerprint.

FIG. 1 depicts a computer system for implementing fingerprint-based processor parameter management in accordance with an embodiment. Computer system 100 includes a processor 101 in communication with a main memory 105. The processor 101 includes one or more cores 102 that execute instructions using cache memory 103. Processor 101 further includes a WOR 104, which holds various parameters that dictate the functioning of the processor 101. Parameters that are stored in WOR 104 may include any of, but are not limited to, the branch history algorithm, branch history depth, the cache data prefetch depth, whether to enable store-hit-load prevention, whether to rout all fixed-point operations to the fixed point unit (FXU), whether to rout all loads to the load unit (not the load store unit), the instruction prefetch depth, and the store gather window. Computer programs, such as hypervisor 106 and application 107, are stored in main memory 105 and executed by the processor 101. Any appropriate number of applications may be executed by a computer system such as computer system 100. An application such as application 107 may issue a call performance optimization engine 108 to update the parameters in WOR 104. The performance optimization engine 108 uses the fingerprint module 110 and fingerprint table 109 to update the WOR 104, as discussed below with respect to FIG. 2. Performance optimization engine 108 may be implemented in hardware or software in various embodiments. Fingerprint table 109 stores fingerprints and previously determined associated WOR parameter values for reuse. Fingerprint table 109 may be a CAM in some embodiments. The fingerprint module 110 may comprise a fingerprint register in some embodiments, and is used to determine the fingerprint of code that is current executing in order to determine parameters that match the current workload of the processor 101. In various embodiments, a processor 101 may include a plurality of different fingerprint modules 110 and associated fingerprint tables 109 that are assigned to respective parameters in WOR 104, e.g., a first fingerprint module and table may handle prefetch-related parameters, and a second fingerprint module and table may handle branch prediction-related parameters. In further embodiments, the outputs multiple fingerprint modules may be combined to determine a single fingerprint value that is stored in a single fingerprint table.

Figure 2:
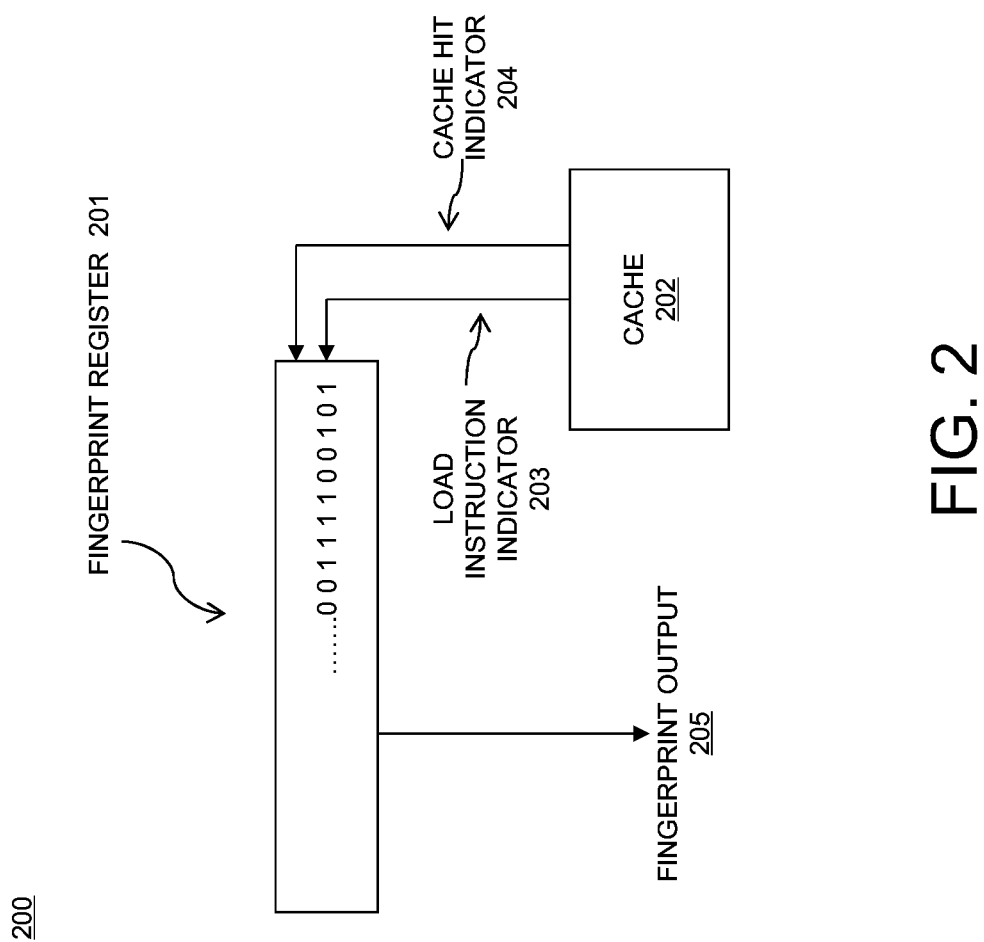
FIG. 2 depicts a fingerprint module in accordance with an embodiment.

FIG. 2 depicts a fingerprint module 200 in accordance with an embodiment. Fingerprint module 200 may comprise fingerprint module 110 of FIG. 1. Fingerprint module 200 comprises a fingerprint register 201 that is a shift register. As shown in FIG. 2, fingerprint register 201 receives input from a cache 202/103 via load instruction indicator 203 and cache hit indicator 204. A '1' is input into the shift register when there is a cache hit, and a '0' is loaded into the shift register when there is a cache miss (i.e., a load instruction with no cache hit). A fingerprint is output on fingerprint output 205; the fingerprint gives a snapshot of the cache hit/miss behavior of the current workload and may be used to identify a workload. The fingerprint register 201 may be of any appropriate size, and the fingerprint that is output on fingerprint output 205 may be the entire contents of the fingerprint register 201 in some embodiments. FIG. 2 is shown for illustrative purposes only; a fingerprint module comprising a shift register may measure any aspect of processor performance in various embodiments.

Figure 3:
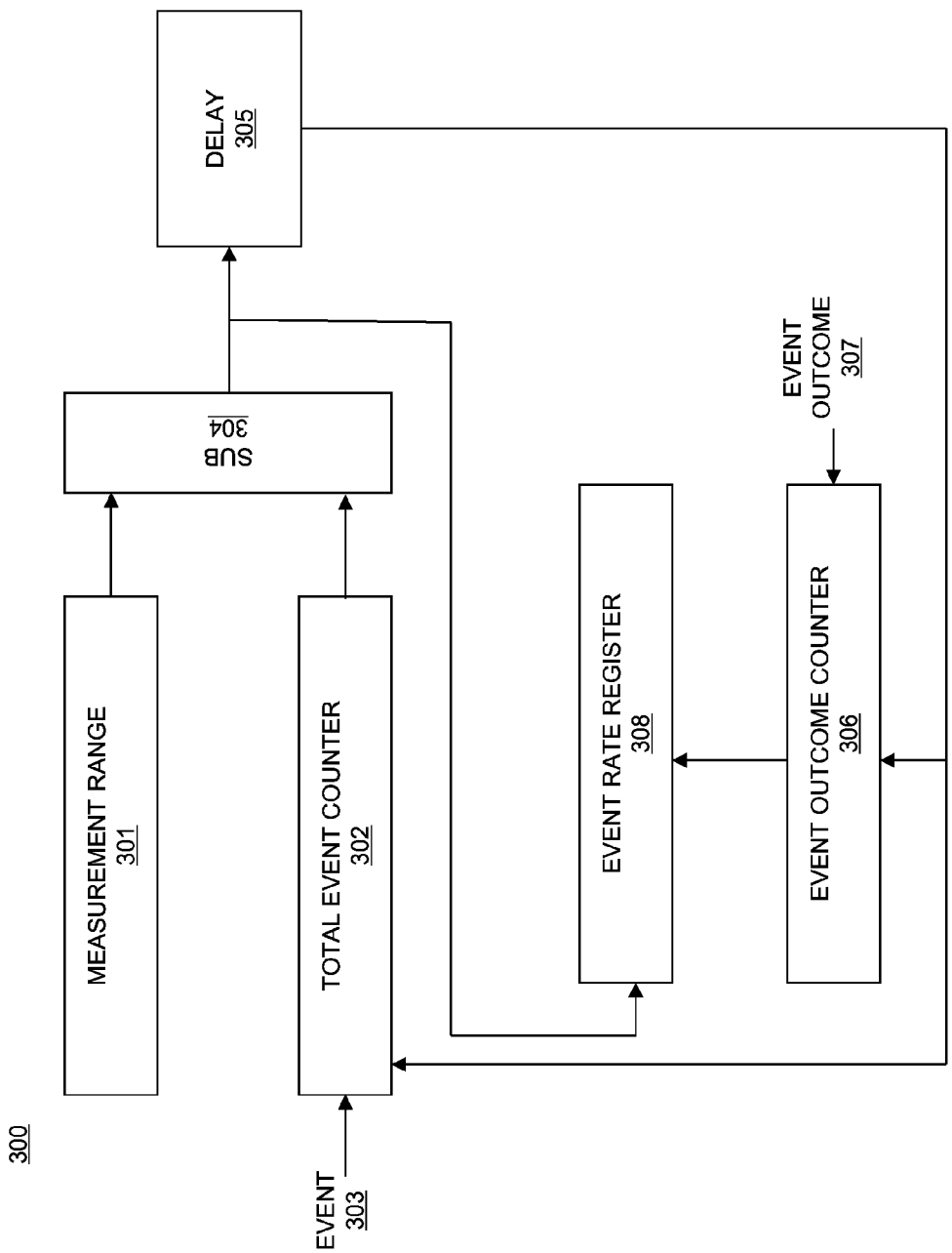
FIG. 3 depicts a fingerprint module in accordance with an embodiment.

FIG. 3 depicts a fingerprint module 300 in accordance with an embodiment. Fingerprint module 300 may comprise fingerprint module 110 of FIG. 1. In fingerprint module 300, the event outcome counter 306 counts each time the event (e.g. a load data cache miss) whose rate is being measured by the fingerprint module 300 occurs, as indicated by event outcome input 307. The total event counter 302 counts the total number of loads or instructions that occur, as indicated by event input 303. The measurement range 301 gives a number of events over which the rate is being measured (e.g. every 1000 loads, or every 1000 instructions, etc.). Whenever the total event counter 302 reaches the number of events over which the rate is being measured as given by measurement rage 301, the subtractor module 304 outputs a signal to the event rate register 308 and delay module 305. The current value of the event outcome counter 306 is gated into event rate register 308 based on the signal from the subtractor module 304. Then, the total event counter 302 and event outcome counter 306 are reset based on the signal from delay module 305. The value in the event rate register 308 therefore represents the rate at which the event being measured has occurred during the number of instructions over which the rate is being measured. The value in event rate register 308 may be used as a fingerprint, or as part of a fingerprint in conjunction with another fingerprint module output. FIG. 3 is shown for illustrative purposes only; a fingerprint module comprising a rate measurement module may measure any aspect of processor performance in various embodiments.

Figure 4:
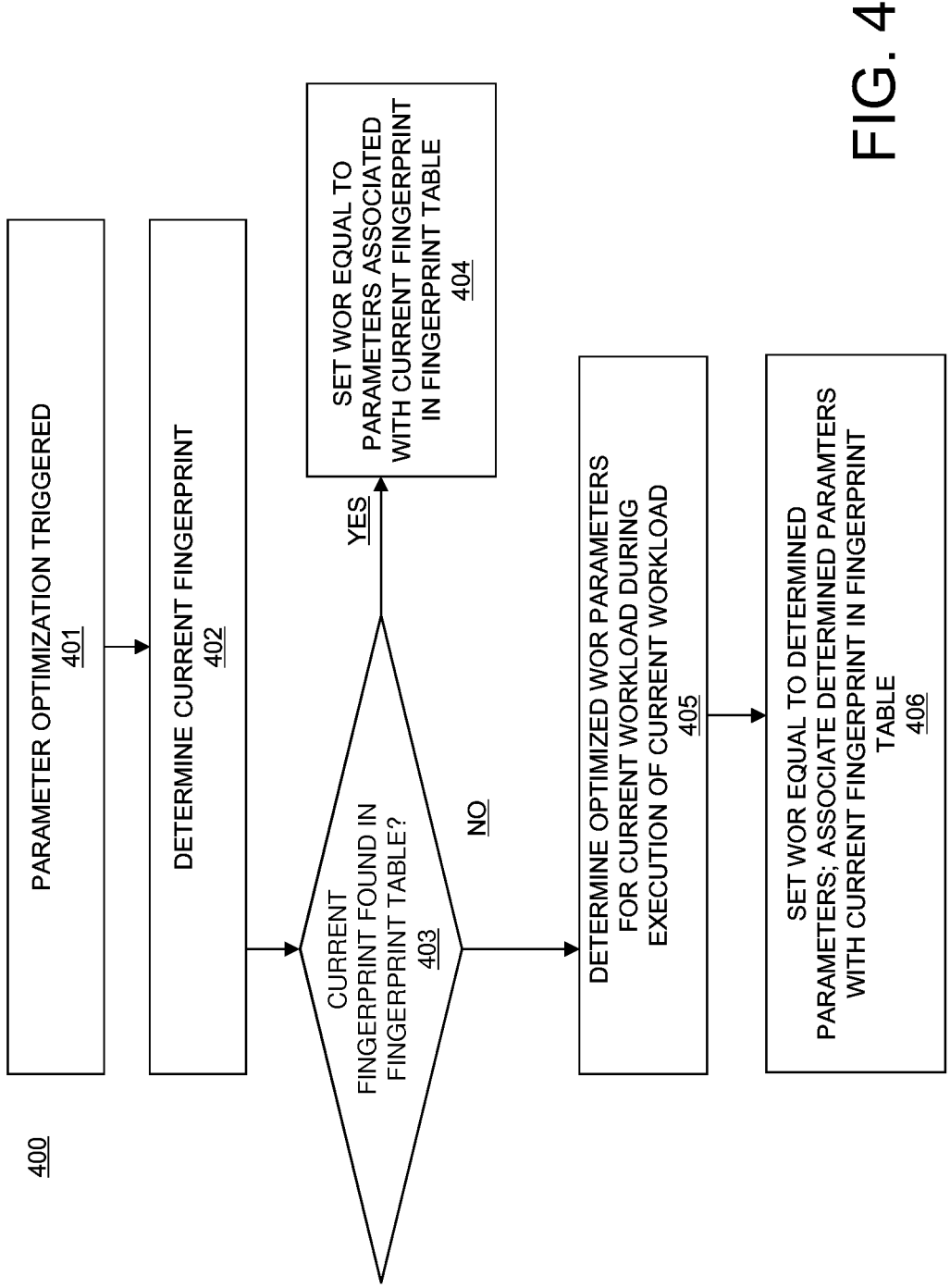
FIG. 4 depicts a process flow for fingerprint-based processor parameter management in accordance with an embodiment.

FIG. 4 depicts a method 400 for processor parameter management using fingerprints in accordance with an embodiment. FIG. 4 is discussed with respect to FIG. 1. First, in block 401, WOR parameter optimization is triggered in computer system 100. In some embodiments, the trigger may be entering a new method in an application 107 that is executing on the computer system 100. Next, in block 402, the fingerprint of the currently executing software, such as a method of application 107, is determined based on one or more fingerprint modules such as fingerprint module 110. The fingerprint represents the historical behavior of the processor leading up to the point at which optimization was triggered, and determination may comprise reading the current value of a fingerprint register 201 and/or a event rate register 308. The fingerprint module(s) may indicate any aspect of the behavior of application 107. The fingerprint module that are used to determine the current fingerprint in block 402 may comprise any of fingerprint module 200 of FIG. 2 and fingerprint module 300 of FIG. 3. Further, a computer system may include multiple fingerprint modules that measure different execution behavior, for example prefetching or branch prediction related behavior. Next, in block 403, it is determined whether the current fingerprint that was determined in block 402 is located in an entry in a fingerprint table 109. The fingerprint table 109 may comprise a CAM in some embodiments. If it is determined in block 403 that the current fingerprint is listed in an entry in the fingerprint table 109, then, in block 404, the associated WOR parameters for the current fingerprint as given by the entry in the fingerprint table 109 are written into the WOR 104, and the current workload is executed according to the parameters in the WOR 104. If it was determined in block 403 that the current fingerprint is not listed in the fingerprint table 109, flow proceeds from block 403 to block 405. In block 405, optimized WOR parameters are determined for the current workload during execution of the current workload. The optimized WOR parameters may be determined in any appropriate manner. Lastly, in block 406, the determined parameters from block 405 are written into an entry in the fingerprint table 109 with the current fingerprint. The optimized parameters are also written into the WOR 104, and the current workload is executed according to the parameters in the WOR 104. Method 400 may be executed separately for separate types of parameters in some embodiments; for example, a first fingerprint module and fingerprint table may be used for a first type of parameters in the WOR 104, and a second fingerprint module and fingerprint table may be used for a second type of parameters in the WOR 104.

Technical effects and benefits include improved performance in a computer processor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for fingerprint-based processor parameter management, the method comprising:
   determining a fingerprint of software that is currently executing on a processor of a computer system, the fingerprint comprising a representation of a sequence of behavior that occurs in the processor while the software is executing;
   determining whether the fingerprint is listed in a fingerprint table with an associated operating parameter value;
   based on determining that the fingerprint is listed in the fingerprint table, setting an operating parameter in a parameter register of the processor equal to the associated parameter operating parameter value;
   based on determining that the fingerprint is not listed in the fingerprint table:
      determining a value for operating parameter during execution of the software;
      setting the operating parameter in the parameter register equal to the determined value; and
      storing the fingerprint with the determined value in the fingerprint table; and
   executing the software by the processor according to the parameter register.

2. The method of claim 1, wherein determining the fingerprint comprises tracking an event in the processor by a fingerprint register, wherein the fingerprint register holds a sequence of ones and zeros indicating different outcomes of the tracked event.

3. The method of claim 2, wherein the event comprises a cache access, wherein the different outcomes comprise cache hits and cache misses, and the operating parameter comprises a prefetching parameter.

4. The method of claim 2, wherein the event comprises branch prediction, wherein the different outcomes comprise correct branch predictions and incorrect branch predictions, and the operating parameter comprises a branch prediction parameter.

5. The method of claim 2, wherein the processor comprises a plurality of fingerprint registers, each fingerprint register configured to track a different event in the processor.

6. The method of claim 1, wherein determining the fingerprint comprises tracking a rate of occurrence of an event outcome for an event in the processor by a fingerprint module, wherein the fingerprint module counts a number of occurrences of the event outcome over a predetermined number of occurrences of the event.

7. The method of claim 6, wherein the fingerprint module comprises a hardware module of the processor.

8. The method of claim 1, wherein the determining the fingerprint of the software is triggered by entering a method in the software.

9. A computer program product for implementing fingerprint-based processor parameter management, the computer program product comprising:
   a computer readable storage medium having program instructions embodied therewith, the program instructions readable by a processing circuit to cause the processing circuit to perform a method comprising:
      determining a fingerprint of software that is currently executing on a processor of a computer system, the fingerprint comprising a representation of a sequence of behavior that occurs in the processor while the software is executing;

determining whether the fingerprint is listed in a fingerprint table with an associated operating parameter value;

based on determining that the fingerprint is listed in the fingerprint table, setting an operating parameter in a parameter register of the processor equal to the associated parameter operating parameter value;

based on determining that the fingerprint is not listed in the fingerprint table:
   determining a value for operating parameter during execution of the software;
   setting the operating parameter in the parameter register equal to the determined value; and
   storing the fingerprint with the determined value in the fingerprint table; and executing the software by the processor according to the parameter register.

10. The computer program product of claim 9, wherein determining the fingerprint comprises tracking an event in the processor by a fingerprint register, wherein the fingerprint register holds a sequence of ones and zeros indicating different outcomes of the tracked event.

11. The computer program product of claim 10, wherein the event comprises a cache access, wherein the different outcomes comprise cache hits and cache misses, and the operating parameter comprises a prefetching parameter.

12. The computer program product of claim 10, wherein the event comprises branch prediction, wherein the different outcomes comprise correct branch predictions and incorrect branch predictions, and the operating parameter comprises a branch prediction parameter.

13. The computer program product of claim 10, wherein the processor comprises a plurality of fingerprint registers, each fingerprint register configured to track a different event in the processor.

14. The computer program product of claim 9, wherein determining the fingerprint comprises tracking a rate of occurrence of an event outcome for an event in the processor by a fingerprint module, wherein the fingerprint module counts a number of occurrences of the event outcome over a predetermined number of occurrences of the event.

15. A computer system for fingerprint-based processor parameter management, the system comprising:
   a memory; and
   a processor, communicatively coupled to said memory, the computer system configured to perform a method comprising:
   determining a fingerprint of software that is currently executing on the processor, the fingerprint comprising a representation of a sequence of behavior that occurs in the processor while the software is executing;
   determining whether the fingerprint is listed in a fingerprint table with an associated operating parameter value;
   based on determining that the fingerprint is listed in the fingerprint table, setting an operating parameter in a parameter register of the processor equal to the associated parameter operating parameter value;
   based on determining that the fingerprint is not listed in the fingerprint table:
      determining a value for operating parameter during execution of the software;
      setting the operating parameter in the parameter register equal to the determined value; and
      storing the fingerprint with the determined value in the fingerprint table; and
   executing the software by the processor according to the parameter register.

16. The system of claim 15, wherein determining the fingerprint comprises tracking an event in the processor by a fingerprint register, wherein the fingerprint register holds a sequence of ones and zeros indicating different outcomes of the tracked event.

17. The system of claim 16, wherein the event comprises a cache access, wherein the different outcomes comprise cache hits and cache misses, and the operating parameter comprises a prefetching parameter.

18. The system of claim 16, wherein the event comprises branch prediction, wherein the different outcomes comprise correct branch predictions and incorrect branch predictions, and the operating parameter comprises a branch prediction parameter.

19. The system of claim 16, wherein the processor comprises a plurality of fingerprint registers, each fingerprint register configured to track a different event in the processor.

20. The system of claim 15, wherein determining the fingerprint comprises tracking a rate of occurrence of an event outcome for an event in the processor by a fingerprint module, wherein the fingerprint module counts a number of occurrences of the event outcome over a predetermined number of occurrences of the event.

* * * * *